J. D. KYNASTON.
WATER PURIFYING APPARATUS.
APPLICATION FILED NOV. 15, 1916.
1,219,333. Patented Mar. 13, 1917.
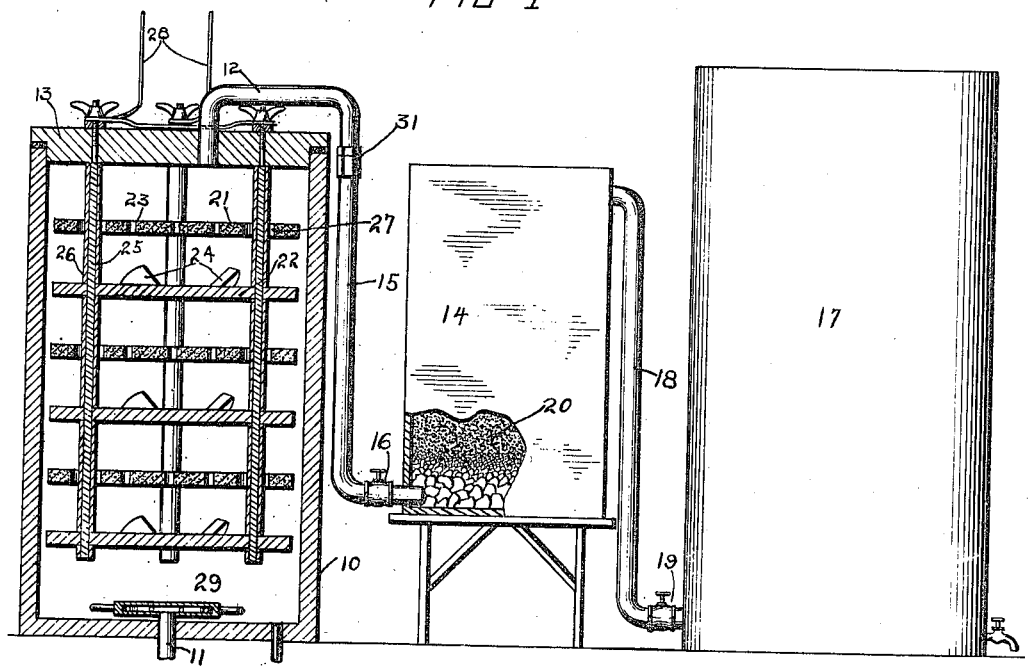
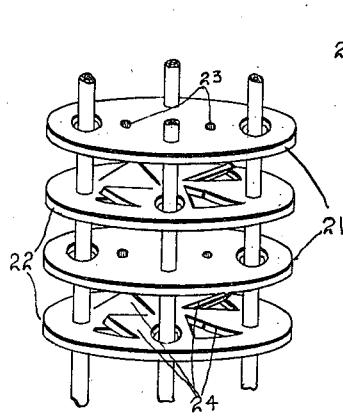
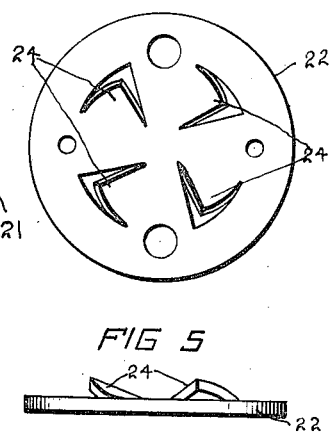
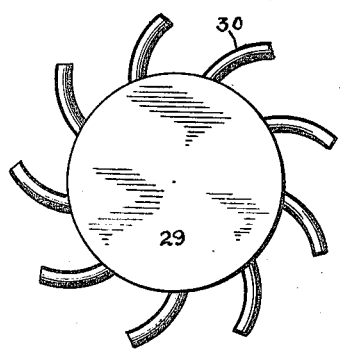
Witnesses
R. A. Thomas
G. E. Logan
John D. Kynaston Inventor
By
Attorney

UNITED STATES PATENT OFFICE.

JOHN D. KYNASTON, OF WASHINGTON, DISTRICT OF COLUMBIA.

WATER-PURIFYING APPARATUS.

1,219,333.  Specification of Letters Patent.  Patented Mar. 13, 1917.

Application filed November 15, 1916. Serial No. 131,427.

*To all whom it may concern:*

Be it known that I, JOHN D. KYNASTON, a citizen of the United States, residing in the city of Washington, District of Columbia, have invented a new and useful Water-Purifying Apparatus, of which the following is a specification.

The object of the invention is to provide a simple, inexpensive and efficient apparatus for the continuous or progressive purification of water, designed through the agency of electricity, properly applied and distributed, to convert nitrogenous and other soluble impurities and animal and vegetable matters either in solution or suspension into insoluble precipitates to produce a coagulum for mechanical separation as by settlement; and further, to provide for a uniform and complete subjection of the liquid to the action of the purifying agencies during the progress of same through the apparatus.

Further objects and advantages of the invention will appear in the following description of a preferred embodiment, it being understood that changes in the form, proportion and minor details may be resorted to within the scope of the appended claims without departing from the spirit of the invention.

In the drawing,

Figure 1 is an elevation partly in section of a preferred form of the apparatus.

Fig. 2 is a detail in perspective of a plurality of the baffling electrodes and their connections.

Fig. 3 is a plan view of the water distributing head.

Fig. 4 is a plan view of a modified construction of the baffle.

Fig. 5 is an edge view of the baffle shown in Fig. 4.

The apparatus consists, essentially, of a conveyer 10 preferably in the form of a cement or equivalent vessel arranged for example in an upright position and having a bottom water inlet 11 and a top water outlet 12, said vessel being provided with a cap or cover 13 having a sealed contact with the wall of the vessel, and a series of baffles arranged within the vessel in the path of water passing upwardly therethrough; a settling tank 14 in communication at its bottom with the water outlet of the tank as by means of a pipe 15 which may be valved, as at 16, for the control of the flow of liquid from the conveyer to the tank; and a reservoir 17 for the purified water after having passed through the settling tank, said reservoir being in communication at its bottom with the top of the settling tank as by means of a pipe 18 which also may be valved, as shown at 19. The settling tank may, as shown, be provided with filtering mediums, as indicated at 20.

The baffles arranged in the conveyer formed, as above noted, by the vessel 10 consist of electrodes of which the cathodes 21 are preferably of carbon while the anodes 22 are preferably of aluminum provided with suitable reduced openings through which the water is permitted to circulate with greater or less freedom, determined for instance by peculiarities or properties of the liquid under treatment. In the construction illustrated, the cathodes are provided with perforations 23 while the anodes, as shown in detail in Fig. 4, are provided with upstruck and deflected tongues 24 which serve as assistant directing and agitating means for the liquid. The electrodes may be supported or suspended in any preferred manner, but as shown they are carried by the cap or cover of the vessel through the agency of connecting rods consisting of metallic conductors 25 which may be of aluminum and are in electrical contact with alternate baffles, as shown clearly in Figs. 1 and 2, and having spacing and insulating sleeves 26 interposed between and terminally in contact with alternate disks and passing freely through enlarged openings 27 in the intermediate disks, whereby said electrodes are disposed in electrical series with the exterior wires 28, any suitable generating means (not shown) being in circuit therewith.

As an auxiliary means for insuring the exposure of all of the liquid passing through the conveyer for subjection to the electrical action of the current passing from one electrode to the other, the water inlet pipe 11 preferably communicates with a rotary drum or head 29 provided with rearwardly directed and substantially tangentially discharging outlet nozzles 30 which serve to impart a gyratory distributing movement to the incoming water which thence finds its way either around or through, or both around and through the baffles formed by the electrodes in its passage to the outlet 12 which may be provided with a coupling 31 which when disengaged permits the removal of the cap or cover from the vessel and the withdrawal of the series of electrodes to permit of efficient cleansing.

The use of aluminum anodes is indicated for one reason because the hydroxid of aluminum formed in the course of the electrical action is not injurious to health and moreover is insoluble in water and therefore may be removed by filtration or other mechanical means, while at the same time it has the property of acting upon nitrogenous and other animal matters in solution or in suspension to produce an insoluble coaglum which may be precipitated or removed from suspension in the passage of the liquid through the settling tank. At the same time that the oxyhydrate of aluminum is acting upon the nitrogenous and similar impurities in the water, a portion of the oxygen gas liberated at the positive pole through the electrolytic decomposition of the water serves by oxidation as an agent to attack vegetable matter which is thus eliminated in the form of carbonic acid gas.

What I claim is:—

1. A water purifying apparatus having a plurality of alternately disposed electrodes arranged in the path of flow of the water and connected in series with a source of electrical energy, and means for imparting a gyratory movement to the water in contact with said electrodes.

2. A water purifying apparatus having a plurality of alternately disposed electrodes arranged in the path of flow of the water and connected in series with a source of electrical energy, the anodes being of aluminum, and means for imparting a gyratory movement to the water in contact with said electrodes.

3. A water purifying apparatus having a plurality of alternately disposed electrodes arranged in the path of flow of the water and connected in series with a source of electrical energy, the anodes being of aluminum and the cathodes of carbon, and means for imparting a gyratory movement to the water in contact with said electrodes.

4. A water purifying apparatus having an upright water conveying vessel having a bottom inlet and a top outlet, a series of alternately arranged cathodes and anodes consisting of baffling disks arranged in the path of water flowing from the inlet to the outlet and disposed in series in a circuit including a source of electrical energy, and a water distributing and gyrating means in communication with the water inlet and consisting of a head or drum provided with rearwardly directed substantially tangential outlet nozzles.

5. A water purifying apparatus having an upright water conveying vessel having a bottom inlet and a top outlet, a series of alternately arranged cathodes and anodes consisting of baffling disks disposed in the path of water flowing from the inlet to the outlet and arranged in series in a circuit including a source of electrical energy, and means for producing a gyratory distribution of the water at the inlet of said vessel, in combination with a filtering settling tank in communication with the outlet of said vessel.

In testimony that I claim the foregoing as my own, I have hereto affixed my signature in the presence of two witnesses.

JOHN D. KYNASTON.

Witnesses:
 ERNEST E. FLETCHER,
 ELMER FLETCHER.